United States Patent [19]

Jaggar

[11] Patent Number: 5,737,625
[45] Date of Patent: Apr. 7, 1998

[54] SELECTABLE PROCESSING REGISTERS AND METHOD

[75] Inventor: David Vivian Jaggar, Cherry Hinton, United Kingdom

[73] Assignee: Advanced Risc Machines Limited, United Kingdom

[21] Appl. No.: 742,071

[22] Filed: Oct. 31, 1996

Related U.S. Application Data

[63] Continuation of Ser. No. 303,080, Sep. 8, 1994, abandoned.

[30] Foreign Application Priority Data

Jan. 26, 1994 [GB] United Kingdom ............ 9401501

[51] Int. Cl.⁶ ........................................... G06F 9/00
[52] U.S. Cl. ........................................ 395/800; 395/568
[58] Field of Search ....................... 395/800.32, 674, 395/568, 481, 309, 310; 369/736

[56] References Cited

U.S. PATENT DOCUMENTS

| | | | |
|---|---|---|---|
| 4,598,358 | 7/1986 | Boddie et al. | 395/800 |
| 4,833,640 | 5/1989 | Baba | 364/900 |
| 4,945,510 | 7/1990 | Maeda et al. | 395/182.13 |
| 5,093,783 | 3/1992 | Kitada | 395/421.1 |
| 5,151,993 | 9/1992 | Yamahata | 395/775 |
| 5,155,853 | 10/1992 | Mitsuhira et al. | 395/725 |
| 5,440,752 | 8/1995 | Lentz et al. | 395/800 |
| 5,459,682 | 10/1995 | Sato | 364/736 |
| 5,481,685 | 1/1996 | Nguyen et al. | 395/375 |
| 5,493,687 | 2/1996 | Garg et al. | 395/800 |
| 5,524,211 | 6/1996 | Woods et al. | 395/200.1 |

FOREIGN PATENT DOCUMENTS

| | | | |
|---|---|---|---|
| 0 561 457 A2 | 9/1993 | European Pat. Off. | G06F 9/30 |
| WO 93/01543 | 1/1993 | WIPO | G06F 9/30 |

*Primary Examiner*—Mehmet B. Geckil
*Attorney, Agent, or Firm*—Fenwick & West LLP

[57] ABSTRACT

A data processing system employing registers for holding data to be processed is described. The registers are grouped into sets of registers 2. A register selecting instruction word controls selection of a particular ones of the registers from within the sets of registers 2 to be available for data processing. The register selecting instruction word includes control fields for each set of registers, the bits of each control field specifying a register swap within the a respective set of register. The new register to be selected is derived from an exclusive OR operation performed upon a currently selected register identification word and the control field for that set of registers.

7 Claims, 8 Drawing Sheets

MULTIPLE REG BANKS

*PRIOR ART*   *Fig.2*

SELECTABLE PROCESSING REGISTERS AND METHOD

RELATED APPLICATIONS

This is a continuation of application Ser. No 08/303,080, filed on Sep. 8, 1994 now abandoned.

BACKGROUND OF THE INVENTION

1. Field of the Invention

This invention relates to the field of processing data. More particularly, this invention relates to the processing of data held within registers, the registers being selectable from a larger group of registers.

2. Description of the Prior Art

As the relative difference between the access speeds of processing registers and memory becomes larger, and as superscaler central processing units issue multiple instructions all requiring distinct registers, there is an increasing need to extend the size of the register files available for processing in order to allow increased performance.

An example of an integrated circuit central processing unit having selectable registers is schematically illustrated in FIG. 1 of the accompanying drawings. This arrangement is similar to that used in the Zilog Z80 processor. In this architecture, the processor is provided with two separate banks of working registers, Bank A and Bank B. The different banks of registers are selected to be available for data processing by a single instruction that results in a selecting signal (Sel A/B) fed to a multichannel 2-way multiplexer. Depending upon which bank is selected, either all of the registers of Bank A are selected or all of the registers of Bank B are selected. It is not possible to select some registers from Bank A and some registers from Bank B. Thus, there is no high speed method of transferring data between register banks and each register bank must execute a separate algorithm.

Another approach is that utilised by the Sun SPARC, Intel i960 and AMD29000 architectures schematically illustrated in FIG. 2 of the accompanying drawings. These architectures provide multiple, partially overlapping register banks. The Sun SPARC and Intel i960 architectures support fixed size windows and the AMD29000 supports variable sized windows. Whilst this mechanism allows data to be passed between windows, by having the windows overlap so that some registers are renamed and others are replaced, the mechanism is coarse as it renames one contiguous set of registers, starting at register 0, and replaces the remainder. In practice, compilers operating with these architectures only exploit register windows for procedure calls.

Another approach is that schematically illustrated in FIG. 3 of the accompanying drawings. In this approach, individual registers from within a large pool of registers may be assigned particular register names under software control. In this approach, one register is renamed with one instruction. Whilst this approach provides considerable flexibility, the need to use one register renaming instruction for every register to be renamed forces program sizes to increase and requires superscaler instruction issue to ensure that register renaming instructions never cause the main arithmetic logic unit to stall.

SUMMARY OF THE INVENTION

An object of the invention is to address the problem of providing flexible access to a large number of registers whilst avoiding the above mentioned problems.

Viewed from one aspect the invention provides apparatus for processing data comprising:
  (i) a plurality of sets of registers for holding data to be processed; and
  (ii) selecting means for selecting for each set of registers at least one and less than all of said registers from that set of registers to be available for data processing, unselected registers from that set of registers being unavailable for data processing.

With this approach, the above problems are addressed by restricting the number of registers that any register can be swapped with to those within a predetermined set of associated registers. Within a set of registers the mechanism serves to swap visible registers with invisible registers. In this way, flexibility is provided by allowing the different sets of registers to be separately manipulated, whilst restricting the register swapping that can occur to within sets of registers avoids the need to provide a disadvantageously complex control mechanism and control instruction set to handle the register swapping process.

It will be appreciated that whilst in some embodiments of the invention more than one register from each set of registers may be simultaneously selected, a more usual and preferred embodiment is one in which said means for selecting selects one register to be available for data processing from each set of registers.

In preferred embodiments of the invention there is provided register control means responsive to a register selecting instruction word for controlling which registers are selected by said selecting means, said register selecting instruction word including a control field for each set of registers, each control field indicating which registers should be selected from among the respective set of registers.

The provision of a control field for each set of registers within the register selecting instruction allows a single instruction to be used to control the full register configuration of the system. The system allows this by virtue of the restriction of swapping registers only within sets of registers which means that the control fields need only have a relatively small number of bits. Thus, sufficient space is available within the instruction word length.

It will be appreciated that it would be possible for the control fields to give an absolute specification of the registers to be selected. However, in preferred embodiments said register control means is responsive to which registers are currently selected for a set of registers and a control field for said set of registers such that two successive applications of said control field results in reselection of said currently selected registers.

Providing a system in which the register control means is responsive to the registers already selected has the advantage that a programmer need not be aware of which registers are already selected either by earlier parts of the same programming task, or in a multi tasking environment, by different algorithms altogether. In this way, a programmer can specify a register swap without having to know which particular physical registers will in fact be involved and perhaps more importantly reverse that swap at the end of a particular procedure call or other program segment to restore the processor to a state assumed by other parts of the program or parallel tasks.

A particularly efficient embodiment of the invention is one in which said control field has N bits, said sets of registers contain $2^N$ registers each identified by an N-bit number, each set of registers contains one currently selected register, and said register control means applies and exclusive OR function to said control field and said N-bit number identifying said currently selected register to generate an N-bit number identifying a next register to be selected.

The exclusive OR function applied to the control field and the N-bit number identifying a currently selected register serves to provide the transparent reversibility discussed above.

A convenient compromise between the length of the control fields and the number of register within each set is one in which N=2.

In addition to the sets of registers from which available registers may be selected, it is preferred to also provide at least one permanently available register not belonging to any of said sets of registers.

These permanently available registers may include registers holding a program counter value or the particular registers within which mathematical operands are loaded prior to a high speed mathematical operation by an ALU. Such registers are either always required or are of a nature in which register swapping does not provide a worthwhile advantage.

An advantageously simple mechanism embodying the invention is one in which said means for selecting comprises a multiplexer for each set of registers for selectively connecting registers within each set of registers to processing logic for processing data held within said registers.

It will also be appreciated that the invention will most advantageously be employed within an integrated circuit central processing unit.

Viewed from another aspect this invention provides a method of data processing comprising the steps of:

(i) holding data to be processed within selected ones of registers within a plurality of sets of registers; and (ii) selecting for each set of registers at least one and less than all of said registers from that set of registers to be available for data processing, unselected registers from that set of registers being unavailable for data processing.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
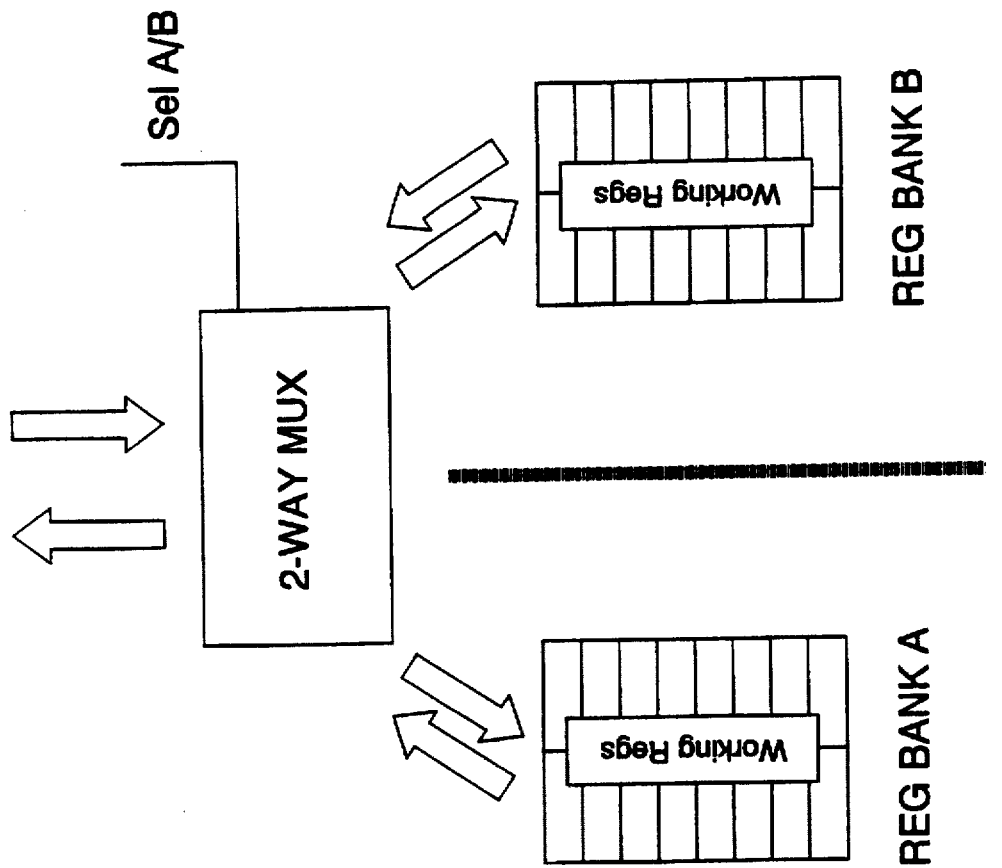
FIGS. 1, 2 and 3 illustrate various known architectures providing selectable registers.
Figure 2:
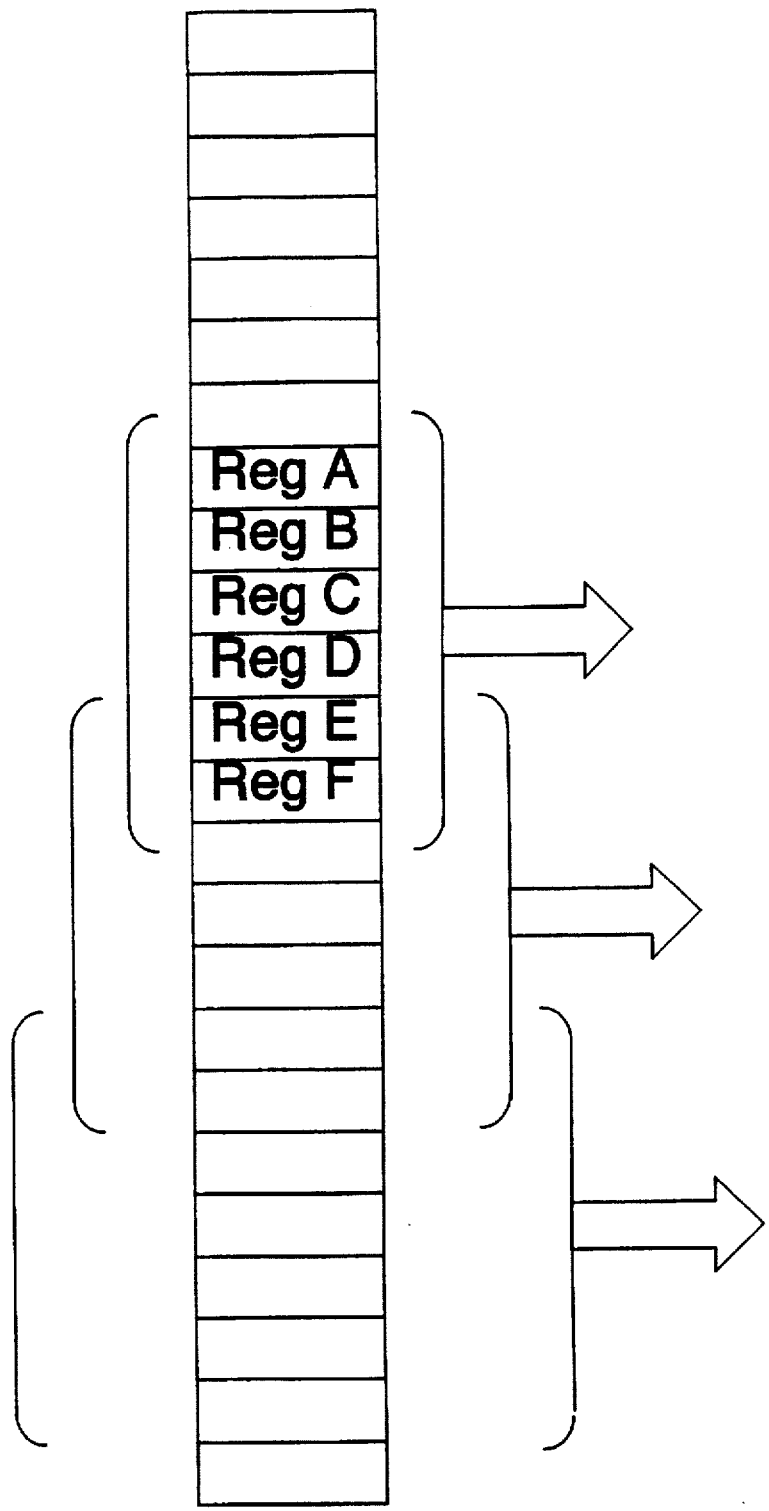
Figure 3:
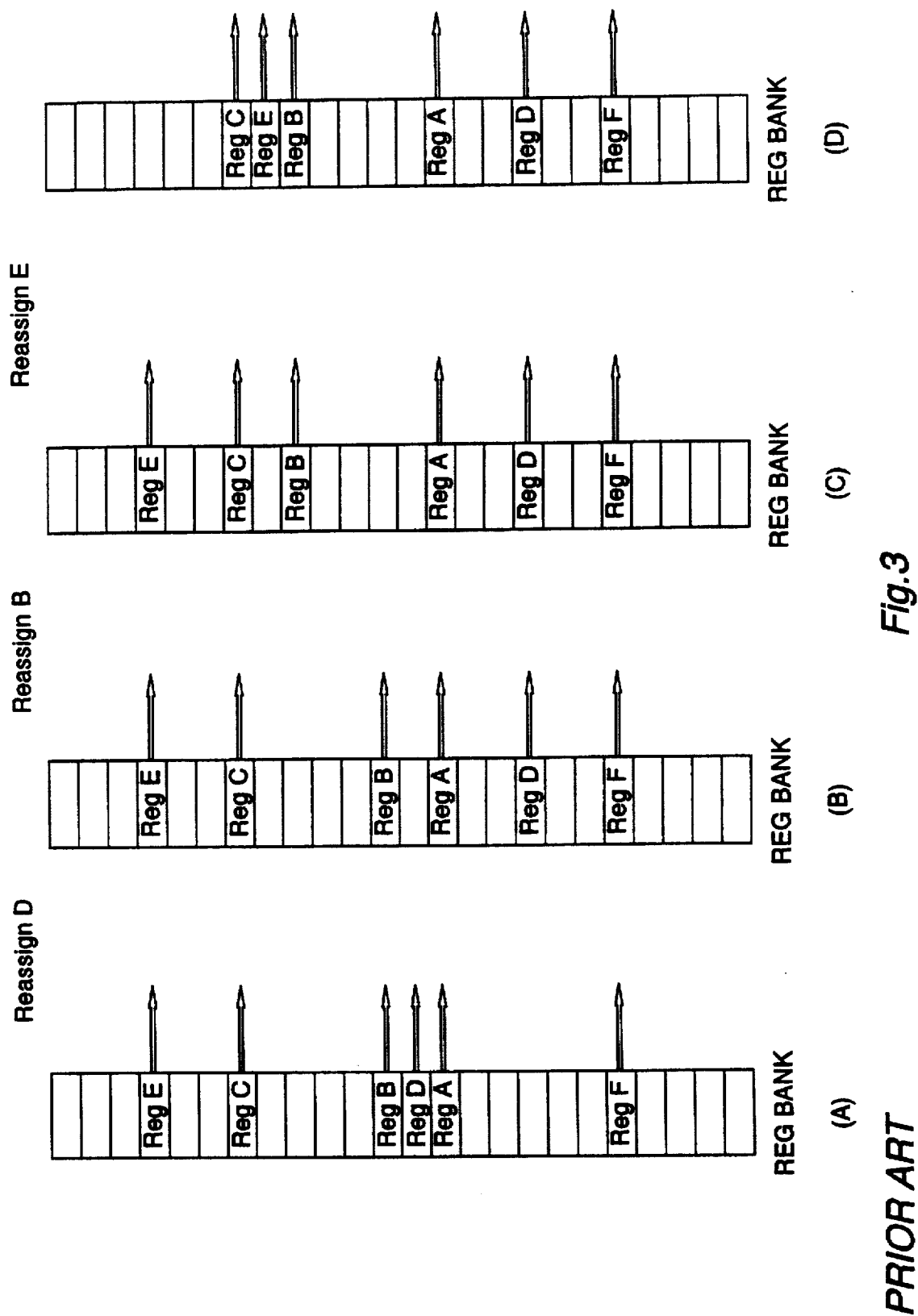
Figure 4:
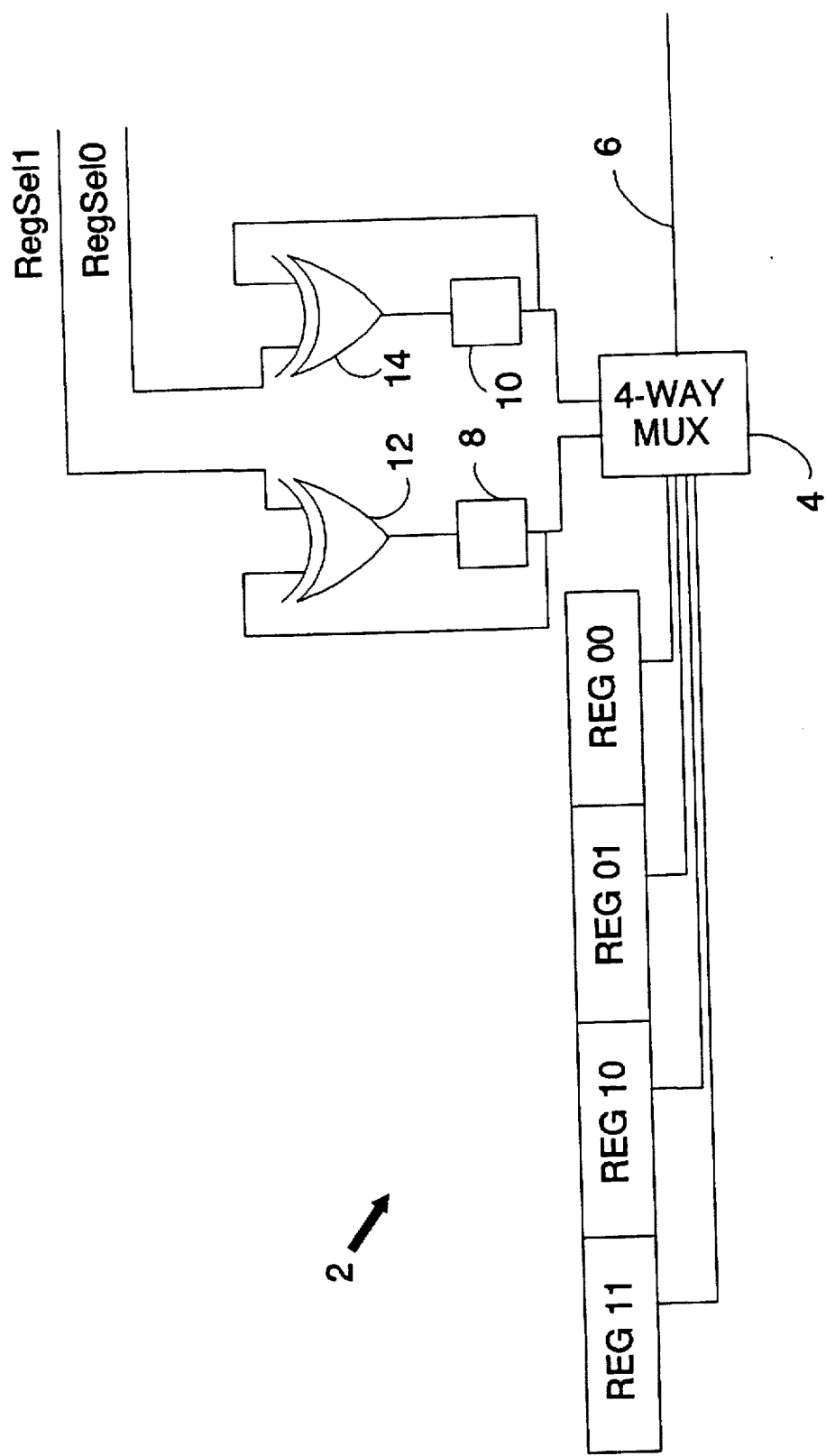
FIG. 4 illustrates a set of registers from among which a particular register is selected to be available for processing.

FIG. 4 shows a set of registers 2 (registers 00, 01, 10 and 11). A 4-way multiplexer 4 selectively connects one of the set of registers to a register bus 6. The 4-way multiplexer is controlled by a 2-bit input from latches 8 and 10. The latch 10 stores a lower order bit and the latch 8 stores a higher order bit. The 2-bit word stored in the latches 8 and 10 selects the register having the corresponding 2-bit identification number from amongst the four registers 00, 01, 10 and 11.

The inputs to each of the latches 8 and 10 are supplied by 2-bit exclusive OR gates 12 and 14 respectively. Each of the exclusive OR gates 12, 14 has one input fed back from the output of its corresponding latch 8, 10 and another input from a respective bit of a 2-bit register selecting word (RegSel1, RegSel0). The 2-bit registers selecting word corresponds to a control field from within a register selecting instruction word for the set of registers 2 concerned. Table 1 shows the 2-bit result of the exclusive OR operation upon the various combinations of the current available register and control field input.

TABLE 1

| | | Current Available Register | | | |
|---|---|---|---|---|---|
| | | 00 | 01 | 10 | 11 |
| Control | 00 | 00 | 01 | 10 | 11 |
| Field | 01 | 01 | 00 | 11 | 10 |
| Input | 10 | 10 | 11 | 00 | 01 |
| | 11 | 11 | 10 | 01 | 00 |

Thus, if the current available register, as identified by the bits stored in the latches 8 and 10, is "01" and the control field input is "10", then the output of the exclusive OR operation will be "11". "11" will then be stored in the latches 8 and 10 and the register "11" selected by the 4-way multiplexer 4.

The various control field inputs can be considered to have the following functions:

00—do not swap this register
01—swap this register with its sibling 1
10—swap this register with its sibling 2
11—swap this register with its sibling 3

The operation of the exclusive OR function is such that each register has its own assigned siblings 1, 2 and 3 with the property that the application of a particular control field input acts as its own inverse. Thus, if the current available register is "10" and the control field input applied is "11", then the current available register will change to "01". If the current available register is then "01" and the same control field input of "11" is applied, then the result will be "10", which is the same register that was originally available.

Figure 5:
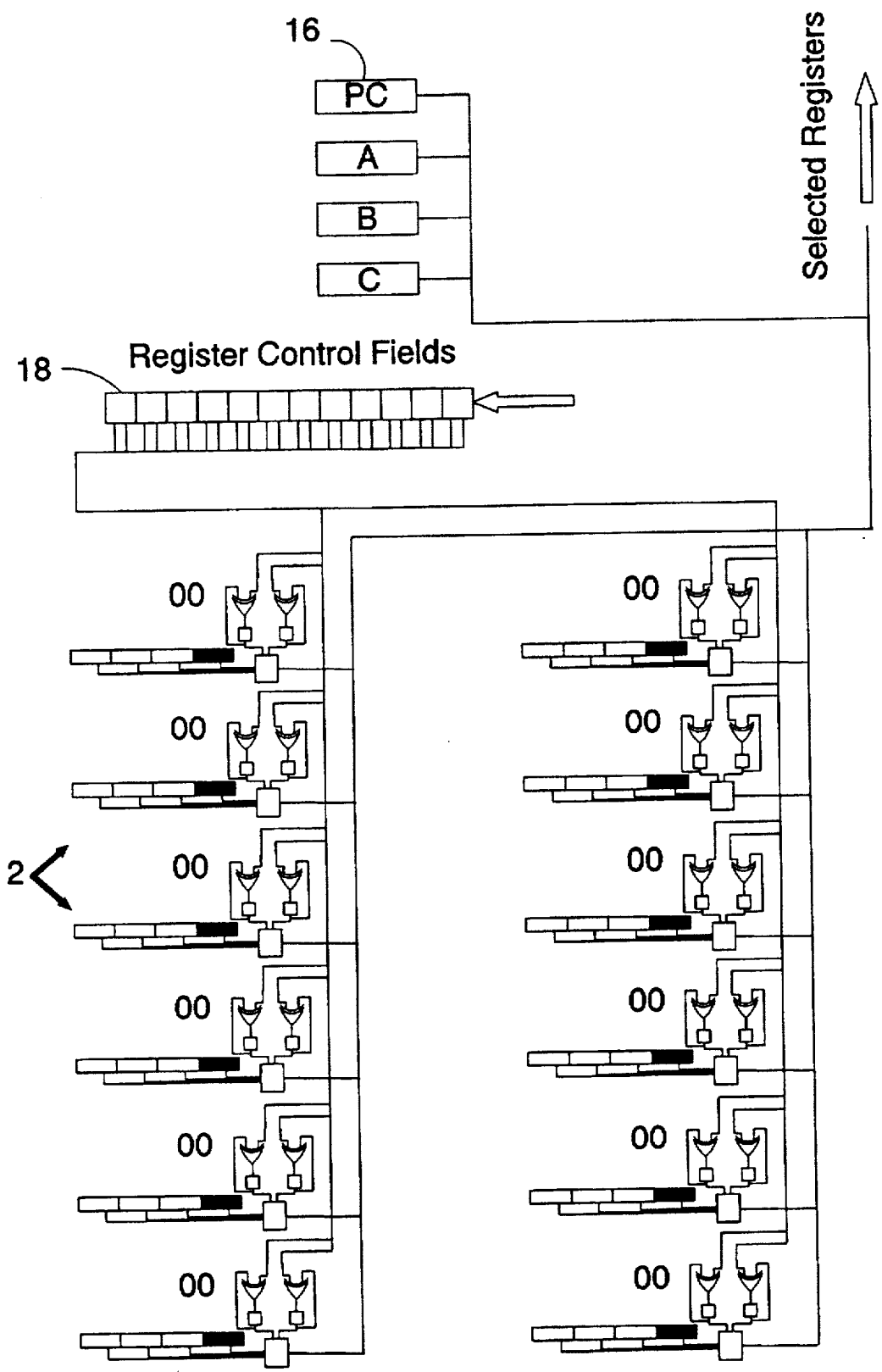
FIG. 5 illustrates a register arrangement for an integrated circuit central processing unit having a plurality of sets of registers from among which registers may be selected to be available.

FIG. 5 illustrates a system incorporating twelve sets of registers 2 as illustrated in FIG. 4. The system also includes a permanently available program counter register 16 and permanently available arithmetic operand registers A, B and C. Upon execution of a register selecting instruction within the central processing unit of which the system illustrated in FIG. 5 forms part, twelve control fields for respective sets of registers are loaded into a control field store 18. From the control field store 18, respective 2-bit control fields are fed to the exclusive OR gates 12, 14 of corresponding sets of registers 2.

Upon initialisation of the system, the register "00" from each set of registers 2 is selected as available and the control field store 18 is loaded with a 24-bit word "00, 00, 00, 00, 00, 00, 00, 00, 00, 00, 00, 00" indicating that no register swaps are required. These control field values are illustrated next to each of the pairs of exclusive OR gates 12, 14 in FIG. 5. The selected register from among the set of registers 2 is shown in black.

Figure 6:
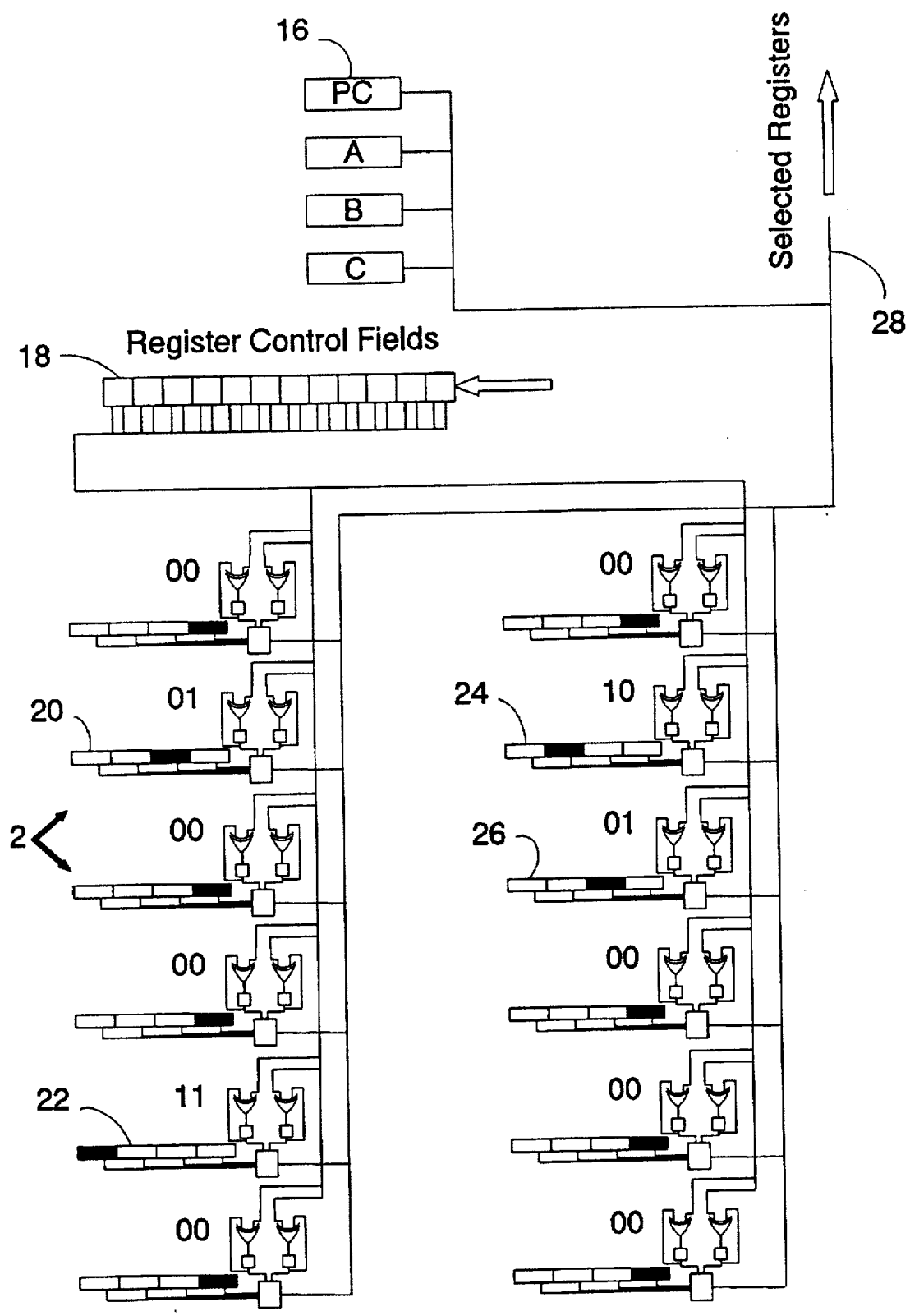
FIGS. 6, 7 and 8 schematically illustrate the operation of the arrangement of FIG. 5.

FIG. 6 illustrates the selection of different registers for some of these sets of registers. Register set 20 is to swap to with its sibling 1. Register set 22 is to swap with its sibling 3. Register set 24 is to swap with its sibling 2. Register set 26 is to swap with its sibling 1. The control field input that achieves this selection is "00, 01, 00, 00, 11, 00, 00, 10, 01, 00, 00, 00". These control field values are first applied to the exclusive OR gates 12, 14 and then the resulting outputs from the exclusive OR gates 12, 14 held within the latches 8, 10 to control the 4-way multiplexers 4. The selected registers are connected to a register bus 28 to which the permanently available registers PC, A, B and C are also connected.

Figure 7:
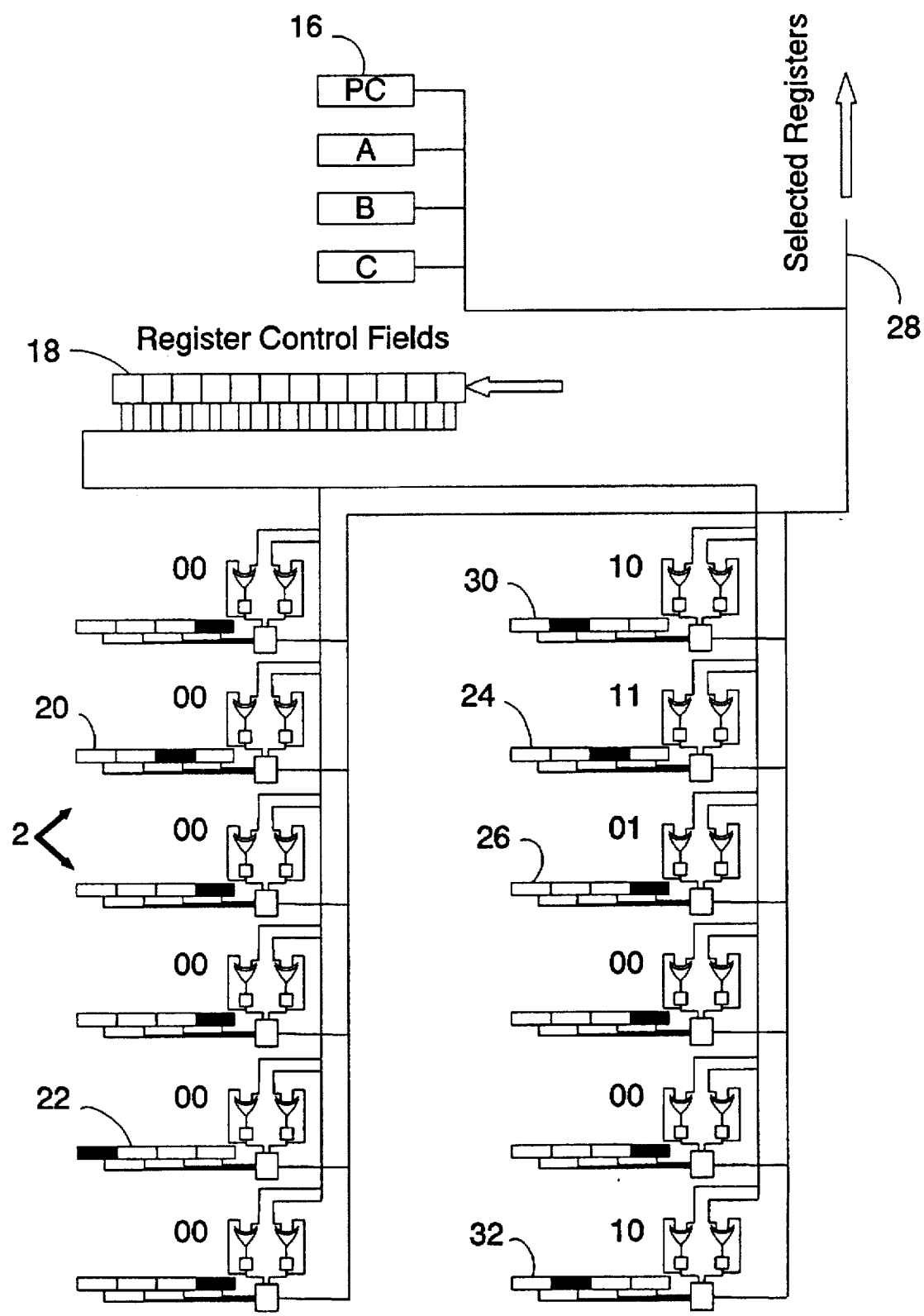

FIG. 7 shows a later operation in which further register selections following on from those illustrated in FIG. 6 are made. In this case, all of the sets of registers other than sets 24, 26, 30 and 32 are left unaltered by applying a control field of "00". Thus, these unaltered sets of registers maintain the selected register from FIG. 6, whether that be register 00 or another register selected in dependence upon a previously applied control field.

Register set 30 selects its sibling 2 to the previously selected register 00, i.e. register 10. The register set 32 also selects its sibling 2 to the previously selected register 00. Register set 24 selects its sibling 3 to the previously selected register 10. Referring to Table 1, with a current available register of 10 and an applied control field input to select the sibling 3 of "11", the result of the exclusive OR operation is "01" and this is the sibling that is selected, i.e. the sibling 3 to register 10 is register 01.

In an analogous manner, the register 01 from the set of registers 26 in FIG. 6 is exclusive ORed with a control field input of "01" to generate an output of "00" leading to selection of the register 00 for the set of registers 26 in FIG. 7.

Figure 8:
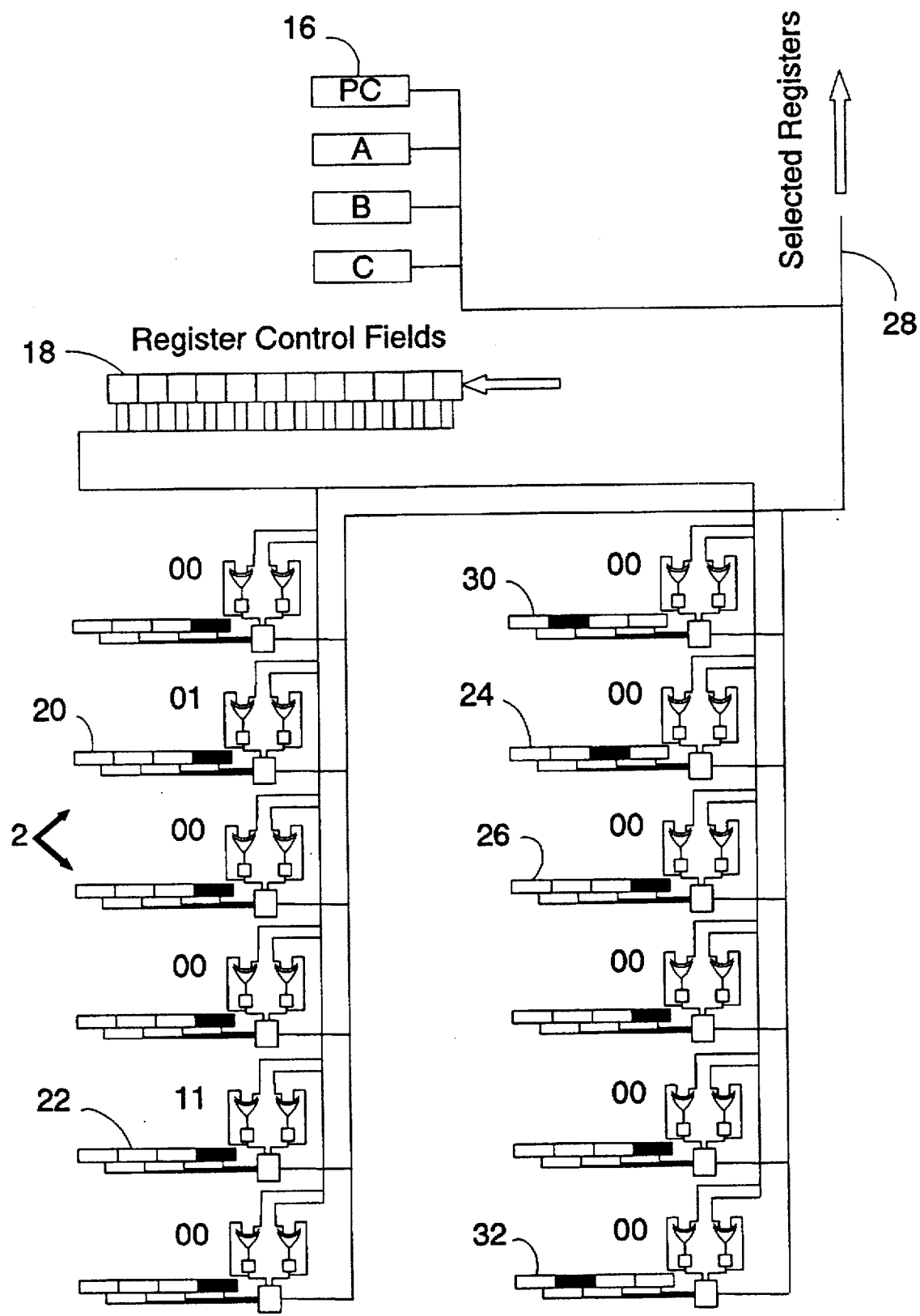

FIG. 8 illustrates a further register selection operation performed upon the registers previously selected as illustrated in FIG. 7. In this case, register swapping only takes place for the sets of registers 20 and 22. The control fields applied to the sets of registers are the same as those applied in FIG. 6. Thus, the control field "01" is applied to the set of registers 20 acting upon a currently selected register 01 to yield a new selected register 00. Thus, it will be seen that re-applying the same control field as was applied in FIG. 6 results in the re-selection of the original register 00, i.e. a control field input is effectively its own inverse function whereby applying the control field twice yields the original result.

In a similar manner, the control field input to the set of registers 22 is "11" which can be seen from Table 1 to yield a new selected register 00.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An integrated circuit central processing unit comprising:

(i) a plurality of sets of registers for holding data to be processed;

(ii) a selecting circuit for selecting from each set of registers one register to be available for data processing specified by subsequent data processing instruction words; and (iii) a register control circuit responsive to a register selecting instruction word separate from and executed at a different time to said data processing instruction words for controlling which register is selected from each set of registers by said selecting circuit, said register selecting instruction word including a control field for each set of registers, each control field indicating which register should be selected from a corresponding set of registers;

(iv) whereby each set of registers includes one selected register, said selected registers being connected to a register bus within said integrated circuit central processing unit for access by said subsequent data processing instruction words that are independent of which particular register within each set of registers is selected for connection to said register bus, those registers within each set of registers that are not selected being disconnected from said register bus and being unavailable for use by said subsequent data processing instruction words.

2. Apparatus as claimed in claim 1, wherein said register control means is responsive to which registers are currently selected for a set of registers and a control field for said set of registers such that two successive applications of said control field results in reselection of said currently selected registers.

3. Apparatus as claimed in claim 3, wherein said control field has N bits, said sets of registers contain $2^N$ registers each identified by an N-bit number, each set of registers contains one currently selected register, and said register control means applies an exclusive OR function to said control field and said N-bit number identifying said currently selected register to generate an N-bit number identifying a next register to be selected.

4. Apparatus as claimed in claim 3, wherein N=1.

5. Apparatus as claimed in claim 1, containing at least one permanently available register not belonging to any of said sets of registers.

6. Apparatus as claimed in claim 1, wherein said means for selecting comprises a multiplexer for each set of registers for selectively connecting registers within each set of registers to processing logic for processing data held within said registers.

7. A method of operating an integrated circuit central processing unit, said method comprising the steps of:

(i) holding data to be processed within selected registers of a plurality of sets of registers;

(ii) selecting from each set of registers one register to be available for data processing specified by subsequent data processing instruction words;

(iii) in response to a register selecting instruction word separate from and executed at a different time to said data processing instruction words, controlling which register is selected from each set of registers, said register selecting instruction word including a control field for each set of registers, each control field indicating which register should be selected from a corresponding set of registers;

(iv) whereby each set of registers includes one selected register, said selected registers being connected to a register bus within said integrated circuit central processing unit for access by said subsequent data processing instruction words that are independent of which particular register within each set of registers is selected for connection to said register bus, those registers within each set of registers that are not selected being disconnected from said register bus and being unavailable for use by said subsequent data processing instruction words.

* * * * *

UNITED STATES PATENT AND TRADEMARK OFFICE
CERTIFICATE OF CORRECTION

PATENT NO. : 5,737,625
DATED : April 7, 1998
INVENTOR(S) : David Vivian Jaggar

It is certified that error appears in the above-identified patent and that said Letters Patent is hereby corrected as shown below:

Column 6,
Line 21, delete "3" and insert -- 2 --
Line 29, delete "N=1" and insert -- N=2 --

Signed and Sealed this

Twelfth Day of August, 2003

JAMES E. ROGAN
*Director of the United States Patent and Trademark Office*